June 13, 1961 T. C. TEDFORD 2,987,928
DRIVE MECHANISM FOR RECIPROCATING PUMPS
Filed Sept. 2, 1959 2 Sheets-Sheet 1

INVENTOR
Thomas C. Tedford,
BY *Kemon and Palmer*
ATTORNEYS

June 13, 1961  T. C. TEDFORD  2,987,928
DRIVE MECHANISM FOR RECIPROCATING PUMPS
Filed Sept. 2, 1959  2 Sheets-Sheet 2

INVENTOR
Thomas C. Tedford,

BY Kenon and Palmer

ATTORNEYS

United States Patent Office 2,987,928
Patented June 13, 1961

2,987,928
DRIVE MECHANISM FOR RECIPROCATING PUMPS
Thomas Caro Tedford, 706 Era Ave., San Angelo, Tex.
Filed Sept. 2, 1959, Ser. No. 837,690
1 Claim. (Cl. 74—37)

This invention relates to drive mechanisms and more particularly to a drive mechanism for reciprocating pumps of the type used in oil wells.

In reciprocating type pumps such as those used in oil wells or in other applications where a long pumping stroke is desirable, the use of endless flexible drive members such as chain and sprocket combinations or the like to transmit a rotary power input to reciprocal movement of polish rods has been known for several years as demonstrated by U.S. Patent No. 1,637,078. Theoretically, such endless chain drives are ideal because the length of polish rod stroke attainable is substantially larger than by other mechanisms available for use in this field. However, with the advent of deeper oil wells and thus the necessity for extremely long polish rods, a problem has developed because an extreme jarring action is produced unless the rates of travel at the ends of the polish rod stroke are reduced during the time in which the direction of polish rod travel is changing from downwardly to upwardly or vice versa. While this problem is to some extent mitigated by the diameter of the sprockets about which the flexible drive member is trained, in practice, this characteristic by itself has been found grossly inadequate to keep the jarring action at the end of the polish rod strokes within safe limits. Moreover, the use of only two sprockets, regardless of their size, at the end of the course of travel assumed by the flexible drive member affords no facility for regulating or changing the length of polish rod stroke without also shortening the drive chain, nor does it in any way permit the varying of the end of stroke characteristics such as the rate of deceleration and acceleration at the ends of the polish rod stroke.

Accordingly, an object of this invention is to provide an endless flexible drive mechanism for use in reciprocating pumps of the type used in oil wells whereby the previously incurred problems are effectively overcome.

Another object of this invention is that of providing an endless flexible drive mechanism of the type referred to with highly effective means for adjusting the length of stroke.

A further object of this invention is to provide an endless flexible drive mechanism of the type referred to wherein a wide variation in the end of stroke characteristics, i.e., deceleration and acceleration of the reciprocatory components during the change in direction thereof may be effected in a highly efficient and satisfactory manner.

Still another object of this invention is that of providing an endless flexible drive mechanism for pumps or the like adaptable to a wide degree of operational characteristics.

Other objects and advantages will be realized from the description which follows taken in conjunction with the attached sheets of drawings in which.

In general, the objects of this invention are accomplished by a drive mechanism incorporating at least one and preferably two endless flexible drive members spaced from one another and carrying therebetween a rod or the like anchored at its ends to corresponding points on each of the chains, which rod is operably connected such as through a chain or the like to the polish rod of a reciprocable pump. The endless flexible drive members are constrained to assume an oblong course of travel by a plurality of sprockets supportingly engageable therewith. The sprockets defining at least one end of the oblong course of flexible member travel are arranged to be mounted in a number of positions on a supporting structure to effect the desired reciprocable output characteristics.

Figure 1:
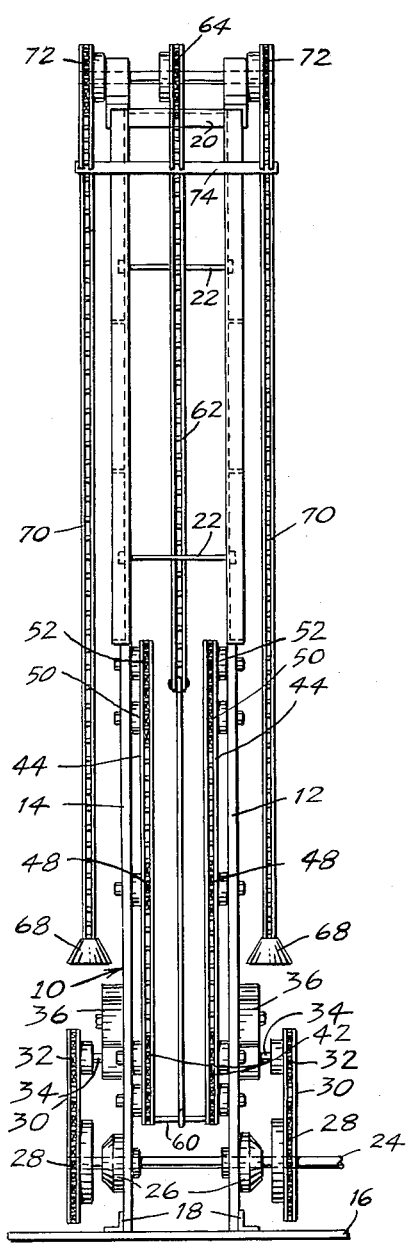
FIG. 1 is a front elevation of a new and improved drive mechanism which forms the subject matter of this invention.
Figure 2:
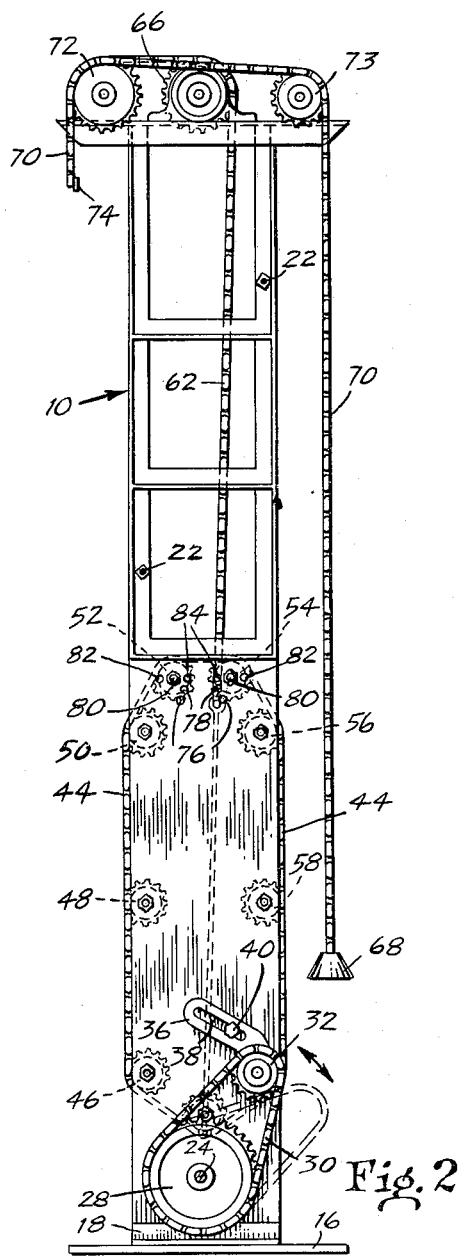
FIG. 2 is a side elevation thereof.

Referring now to the drawings and more particularly to Figs. 1 and 2 thereof, the drive mechanism of this invention is shown having a frame structure generally designated by the numeral 10 having a pair of side walls 12 and 14 adapted to be secured on a base plate 16 such as by a pair of angle brackets 18. The frame sidewalls 12 and 14 are retained in a spaced relationship with one another at their upper ends by a pair of cross beams 20 and by a plurality of bolts 22 positioned in vertically spaced relation over the height of the frame.

Power input to the drive mechanism of this invention is through a rotary shaft 24 which is operably connected to a source of rotary power not shown. The shaft 24 is journalled in bearings 26 at the lower end of the frame sidewalls 12 and 14 respectively and keyed thereto on opposite sides of the frame are a pair of sprockets 28 drivingly engaged with a pair of endless chains 30. The chains 30 are also trained about a pair of sprockets 32 which are keyed on a pair of shafts 34. Each of the shafts 34 is journalled in the end of a pair of adjustable brackets 36 having slots 38 therein for attachment to the sidewalls 12 and 14 by bolts 40. Keyed at the inside end of the shafts 34 are a pair of drive sprockets 42, each of which is drivingly engageable with one of a pair of endless drive chains 44. The drive chains 44 are constrained to a generally oblong course of travel by a plurality of idler sprockets 45, 46, 48, 50, 52, 54, 56 and 58. It is in this arrangement of drive and idler sprockets for retaining the drive chains 44 in a desired course of travel that provides one of the more salient features of this invention. The advantages of this arrangement and the functioning thereof will be more clearly understood in view of the detailed description below.

It is to be noted that for purposes of description only, the flexible drive means of this invention are referred to herein as drive chains and as such are supported on sprockets. It is apparent that other forms of flexible drive means could be used such as belt and pulley arrangements without in any way departing from the spirit and scope of this invention.

Interconnecting the drive chains 44 at corresponding points thereon is a transversely extending rod or connector pin 60. A length of chain 62 is affixed at one end to the rod 60 and extends upwardly over a pair of idler sprockets 64 and 66, and thence downwardly to permit attachment to the polish rod of a reciprocating well pump not shown.

For counterbalancing purposes a pair of weights 68 are suspended at the end of chains 70 which extend over the top of idler sprocket pairs 72 and 73 rotatably supported at the upper end of the frame 10. The ends of the chains 70 opposite the ends to which the weights 68 are attached, like the chain 62, extend downwardly and are connected to a bar 74, the central portion of which is connected to the chain 62. Thus, it will be seen that any movement of the chain 62 and thus the polish rod, not shown, will necessitate the vertical reciprocation of the weights 68. In view of the fact that these weights travel solely in a vertical plane throughout their complete cycle of travel, the desirable characteristic of obtaining the same counterbalancing force throughout the complete stroke of the pump polish rod is achieved.

Figure 3:
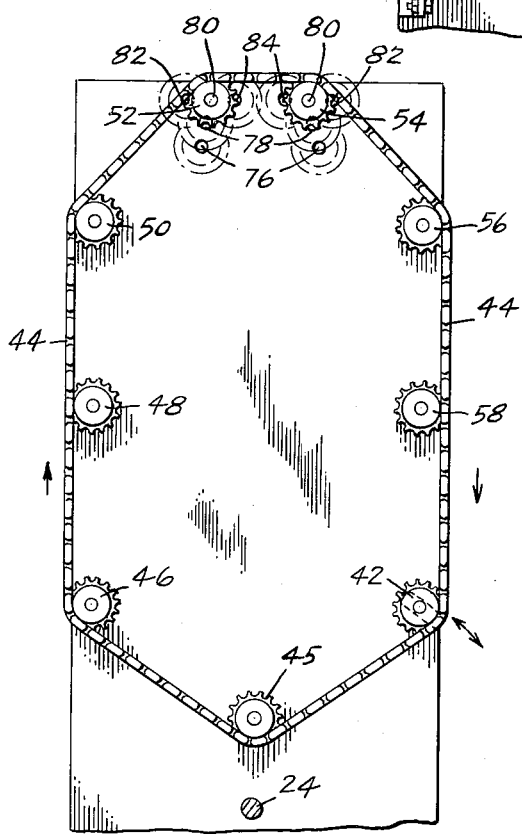
FIG. 3 is an enlarged side elevation showing one embodiment by which drive chain sprocket adjustability is afforded.

Referring now to FIG. 3 wherein the adjustability of idler sprockets to regulate the course of travel assumed by the endless drive chains 44 and thus alter the output characteristics thereof is shown, we note that the sideplates or walls 12 and 14 of the frame 10 are provided with apertures to receive the shafts of idler sprockets 45, 46, 48, 50, 52, 54, 56 and 58 respectively. The drive sprockets 42 of course are adjustably mounted on the brackets 36 as aforementioned. In the preferred embodiment of this invention, only the idler sprockets 52 and 54 are rendered adjustable, although it is to be distinctly understood that other of the idler sprockets or drive sprockets could be adjusted without departing from the spirit and scope of this invention. In the embodiment illustrated in FIG. 3, the idler sprockets 52 and 54 are adapted to be received by any two of a plurality of apertures in the side plates or walls 12 and 14, designated by the reference numerals 76, 78, 80, 82 and 84. Preferably, the apertures 76, 78, and 80 are disposed on lines converging upwardly and each making an acute angle with the vertical. From the description of operation which follows below, however, it will be obvious that the specific angle the line on which these apertures are disposed makes with the vertical can be varied substantially.

In operation, it will be understood that rotation of the shaft 24 and sprockets 28 causes rotation of the sprockets 32 through the chains 30 resulting in rotation of the drive sprockets 42 engageable with the endless chains 44. Since the chains 44 are caused to travel about a path established by the several idler sprockets 45 through 58, and since the pump polish rod is connected through the bar 74, chain 62 and transverse pin 60 to points on the endless chains 44, rotation of the chains 44 results in a reciprocation of the bar 74 and thus the polish rod as is commonly known in pump actuating means of the type to which this invention relates. Further, the length of stroke through which the polish rod is caused to reciprocate will be understood by those familiar in this art to equal the length of the major axis of the course of travel taken by the endless drive chains 44. In this instance, this length of stroke will be established by the distance between the lowermost idler sprocket 45 and the uppermost idler sprockets 52 and 54, though it is obvious that the major axis could be other than vertical or substantially so.

While adjustability of the polish rod stroke is in itself a highly desirable characteristic in pump actuating apparatus of this type, another feature which has become significant especially with the advent of increasingly deepened wells and correspondingly the extremely long polish rods necessitated thereby is that of eliminating the jarring effect of the abrupt change of direction at the end of the polish rod stroke normally inherent in drives of this type. Theoretically, and referring to FIG. 3, although the distance between the horizontal position of sprockets 45 and sprockets 52 and 54 establishes the length of polish rod stroke, the jarring effect due to the change in direction thereof incurred at each end of the stroke depends upon the path taken by connector rod 60 in going from one vertical position of the course of travel of the endless drive chains 44 to the other. In other words, the amount of jarring that takes place at the bottom of the polish rod stroke depends on the vertical acceleration and deceleration incurred by the polish rod at this point. Correspondingly, this acceleration and deceleration is governed by the course of travel established by the chains 44 at the upper end thereof and taken by the pin 60 since only the vertical components of pin movement result in polish rod reciprocation.

A better understanding of this concept and as well the application of the present invention tnereto will be had by noting that in FIG. 3, when the sprockets 52 and 54 are positioned in the apertures 80 and the chains 44 are traveling in a clockwise direction as indicated by the arrows, a deceleration or slow down period occurs when the pin 60 is positioned between the idler sprockets 50 and 52; a dwell period or period of no vertical movement when it is positioned between sprockets 52 and 54; and a speed-up zone or period of acceleration when the pin is disposed between the sprockets 54 and 56. Thus, when the sprockets 52 and 54 are positioned in either of the apertures 80, 82 or 84, a maximum length of stroke is achieved, while the deceleration and acceleration characteristics of drive imparted to the polish rod differs for each position. For example, a maximum amount of slowdown is achieved when the sprockets 52 and 54 are positioned in apertures 84; an intermediate amount when they are positioned in the apertures 80 as shown in FIG. 3, and a minimum amount of acceleration and deceleration or vice versa is effected when these sprockets are in the apertures 82.

Correspondingly, the stroke may be adjusted by mounting the sprockets 52 and 54 in either of the apertures 78 or 76. When mounted in these apertures, the positions taken by the sprockets 52 and 54 will affect to some degree, the slowdown characteristics though the angle of the line on which they are centered assures the desired amount. Moreover, any slack that occurs in the drive chains 44 can be taken care of by proper adjustment of the drive sprockets 42.

Although the use of only two adjustable sprockets 52 and 54 at the upper portion of the drive chains 44 (correspondingly, the portion applicable to the lower end of polish rod stroke) is desirable for normal lengths of polish rod stroke, when longer strokes are required, to the extent that increased drive chain velocity is needed to maintain proper stroke velocity, it may be desirable to increase the number of adjustable idler sprockets to support this portion of the drive chain. The reason for this is that the jarring effect increases with increased stroke velocity and correspondingly, increased cushioning or slow-down is needed. By increasing the number of idler sprockets in this manner, the transitional portion of travel by the connector pin 60 from one side of the drive chain major axis to the other can be more precisely regulated and to a larger extent. Accordingly, the desired cushioning can be achieved for any degree of jarring incurred.

Figure 4:
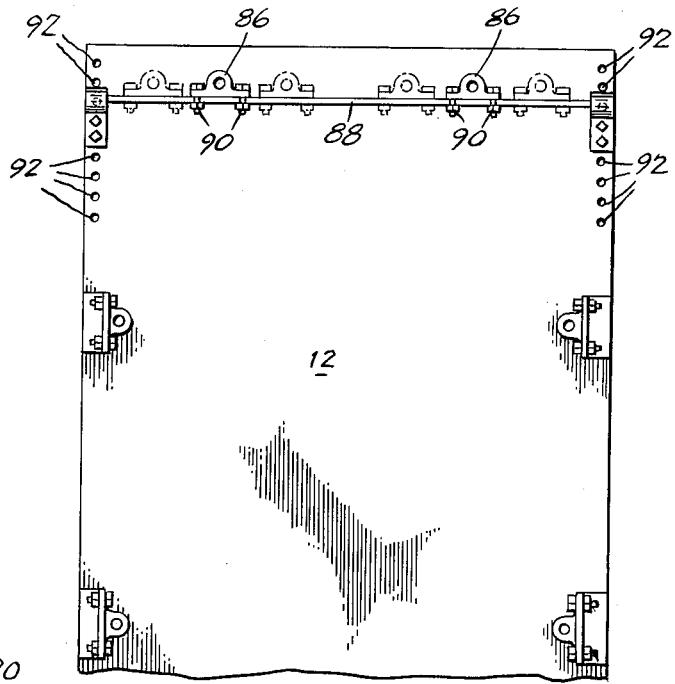
FIG. 4 is an enlarged side elevation illustrating a modified mechanism for mounting drive chain sprockets.

An alternative embodiment of the idler sprocket mounting structure of this invention is illustrated in FIG. 4. In this instance, the sprockets 52 and 54 are mounted in pillow block type bearings 86 which in turn are adjustably supported on a sliding bar 88. The bearings 86 are movably clamped into various positions on the sliding bar such as by bolts 90, though it is possible that any number of other suitable clamping means may be used for this purpose. Correspondingly, the vertical position of the bar and thus the sprockets in this instance is adjustable on the frame sidewalls 12 or 14 by being bolted or otherwise affixed in apertures 92 therein, though again other clamping means may be used to effect the positioning of the bar 88 along the frame sidewalls. It will be seen therefore, that by this arrangement an infinite number of positions can be obtained to establish the desired length of polish rod stroke as well as the slow down characteristics thereof.

Thus, in view of the foregoing, it will be seen that there is provided by this invention a new and useful drive mechanism for reciprocating pumps which can be readily adjusted to meet the requirements of all types of pumping equipment and further a mechanism whereby the extreme problems of jarring and stroke adjustability previously encountered are overcome. For example, the drive mechanism of this invention can be used in pumping wells having depths varying from less than 2000 feet to over 25,000 feet without requiring any increase in input horsepower and, as well, may be used to pump one well or several oil wells at one time. The drive mechanism of this invention will function in a clockwise or counter-clockwise direction and thus is capable of use with any power plant having a rotary output whether electric, gasoline or the like. Also, while in the above description, the drive mechanism is disclosed as operating in a vertical position, it will be obvious to one familiar in this art that it can be made to function as well in a horizontal position. Moreover, it is to be distinctly understood that the foregoing description is illustrative only and that various changes in details might be made without departing from the scope of this invention as defined in the appended claim.

I claim:

A drive mechanism for reciprocating pump polish rods comprising: a frame structure having a pair of spaced side walls; a pair of endless flexible drive chains; means for driving said chains; a transverse pin connected between said drive chains; chain means for interconnecting said pin to a polish rod and a counterbalancing means, and a plurality of sprockets supporting said drive chains for movement through an oblong course of travel to define a pair of substantially parallel runs corresponding directly to high speed movement during the major portion of polish rod stroke, the end of the oblong course corresponding to the upper limits of polish rod movement being defined by at least three sprockets to effect a pair of oppositely inclined runs between said parallel runs and the end of the oblong course of travel corresponding to the lower limits of polish rod movement being defined by at least four sprockets to establish between said parallel runs, a pair of oppositely inclined runs separated by a run perpendicular to said parallel runs, the central two of said four sprockets being movably mounted on said side walls to vary the slopes of said last mentioned pair of inclined runs.

References Cited in the file of this patent

UNITED STATES PATENTS

| | | |
|---|---|---|
| 849,185 | Baldwin | Apr. 2, 1907 |
| 1,637,078 | Hill | July 26, 1927 |
| 1,666,227 | Willrich | Apr. 17, 1928 |
| 1,711,806 | Phipps | May 7, 1929 |
| 1,778,228 | Reschke | Oct. 14, 1930 |